US012038711B2

(12) United States Patent
Sakai et al.

(10) Patent No.: US 12,038,711 B2
(45) **Date of Patent: *Jul. 16, 2024**

(54) IMAGE FORMING APPARATUS CAPABLE OF INSERTING SHEET TRAY IN ONE DIRECTION AND DISCHARGING PRINTED SHEET IN OPPOSITE DIRECTION

(71) Applicant: Brother Kogyo Kabushiki Kaisha, Nagoya (JP)

(72) Inventors: Ryosuke Sakai, Nagoya (JP); Hideshi Nishiyama, Owariasahi (JP); Isami Fujisawa, Gifu (JP); Yukiko Kitamura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/047,112

(22) Filed: Oct. 17, 2022

(65) Prior Publication Data

US 2023/0109925 A1 Apr. 13, 2023

Related U.S. Application Data

(60) Division of application No. 16/115,628, filed on Aug. 29, 2018, now Pat. No. 11,493,871, which is a (Continued)

(30) Foreign Application Priority Data

Mar. 4, 2016 (JP) ................................ 2016-042859
Mar. 4, 2016 (JP) ................................ 2016-042861

(51) Int. Cl.
*G03G 15/00* (2006.01)
*B65H 29/60* (2006.01)

(Continued)

(52) U.S. Cl.
CPC ......... *G03G 15/6552* (2013.01); *B65H 29/60* (2013.01); *B65H 85/00* (2013.01);

(Continued)

(58) Field of Classification Search
CPC .......... G03G 15/6552; G03G 15/6582; G03G 15/6585; B65H 29/60; B65H 85/00; B65H 2402/10; B65H 2801/27; B44C 1/1729
See application file for complete search history.

(56) References Cited

U.S. PATENT DOCUMENTS 5,083,157 A 1/1992 Smith et al.
6,314,267 B1 11/2001 Kida (Continued)

FOREIGN PATENT DOCUMENTS

CN 1550439 A 12/2004
JP 2004-334040 A 11/2004

(Continued)

OTHER PUBLICATIONS

Mar. 14, 2017—International Search Report—Intl App PCT/JP2017/005346.

(Continued)

*Primary Examiner* — Jennifer Bahls
*Assistant Examiner* — Quang X Nguyen
(74) *Attorney, Agent, or Firm* — Banner & Witcoff, Ltd.

(57) ABSTRACT

An image forming apparatus includes a housing, a toner image forming portion, a foil transfer unit, a sheet tray, and a discharge portion. The toner image forming portion is provided in the housing and configured to form a toner image on a sheet. The foil transfer unit is configured to superpose a foil with a surface of the sheet. The sheet tray is installable in the housing in an inserting direction and configured to accommodate a sheet to be supplied to the (Continued)

toner image forming portion. The first discharge portion is configured to discharge the sheet from the foil transfer unit to the outside of the housing in a discharging direction opposite to the inserting direction. The second discharge portion is configured to discharge the sheet from the toner image forming portion to the outside of the housing without passing through the foil transfer unit in the discharge direction.

9 Claims, 10 Drawing Sheets

Related U.S. Application Data continuation of application No. PCT/JP2017/005346, filed on Feb. 14, 2017.

(51) Int. Cl.

*B65H 85/00* (2006.01)
*G03G 21/16* (2006.01)
*B44C 1/17* (2006.01)

(52) U.S. Cl.

CPC ..... *G03G 15/6582* (2013.01); *G03G 15/6585* (2013.01); *G03G 21/16* (2013.01); *G03G 21/1695* (2013.01); *B44C 1/1729* (2013.01); *B65H 2402/10* (2013.01); *B65H 2801/27* (2013.01)

(56) References Cited

U.S. PATENT DOCUMENTS

| | | | |
|---|---|---|---|
| 7,107,004 B2 | 9/2006 | Saito | |
| 8,530,122 B2 | 9/2013 | Uchino et al. | |
| 8,632,934 B2 | 1/2014 | Shirai et al. | |
| 8,649,721 B2 | 2/2014 | Kosasa | |
| 2003/0156877 A1 | 8/2003 | Tischer | |
| 2004/0228650 A1 | 11/2004 | Saito | |
| 2006/0210337 A1 | 9/2006 | Nagata et al. | |
| 2012/0028175 A1 | 2/2012 | Uchino et al. | |
| 2012/0251174 A1 | 10/2012 | Shirai et al. | |
| 2012/0269542 A1 | 10/2012 | Kosasa | |
| 2012/0321362 A1 | 12/2012 | Hirota | |
| 2013/0220531 A1 | 8/2013 | Ohashi | |
| 2013/0287455 A1 | 10/2013 | Suzuki | |
| 2013/0308992 A1 | 11/2013 | Suzuki | |
| 2014/0353908 A1 | 12/2014 | Kobayashi | |
| 2015/0183597 A1 | 7/2015 | Kobayashi | |
| 2020/0024095 A1* | 1/2020 | Tsuji | G03G 15/234 |

FOREIGN PATENT DOCUMENTS

| | | |
|---|---|---|
| JP | 2009-028967 A | 2/2009 |
| JP | 2009-040015 A | 2/2009 |
| JP | 2012-048221 A | 3/2012 |
| JP | 2012-215836 A | 11/2012 |
| JP | 2012-228801 A | 11/2012 |
| JP | 2013-001032 A | 1/2013 |
| JP | 2013-173289 A | 9/2013 |
| JP | 2014-029468 A | 2/2014 |
| JP | 2014-235372 A | 12/2014 |

OTHER PUBLICATIONS

Sep. 13, 2018—(WO) International Preliminary Report on Patentability—Intl App PCT/JP2017/005346, Eng Tran.

Jan. 7, 2020—(JP) Notice of Reasons for Refusal—App 2016-042861, Eng Tran.

Jun. 23, 2020—(JP) Notice of Reasons for Refusal—App 2016-042861, Eng Tran.

Jul. 2, 2021—(CN) The Second Office Action—App 201780015056.6, Eng Tran.

Feb. 21, 2022—(CN) The Decision of Rejection—App 201780015056.6, Eng Tran.

* cited by examiner

IMAGE FORMING APPARATUS CAPABLE OF INSERTING SHEET TRAY IN ONE DIRECTION AND DISCHARGING PRINTED SHEET IN OPPOSITE DIRECTION

CROSS REFERENCE TO RELATED APPLICATION

This application is a division of U.S. application Ser. No. 16/115,628 filed on Aug. 29, 2018, which is a by-pass continuation application of International Application No. PCT/JP2017/005346 filed Feb. 14, 2017 in the Japan Patent Office acting as Receiving Office and claiming priorities from Japanese Patent Application Nos. 2016-042859 filed Mar. 4, 2016, and 2016-042861 filed Mar. 4, 2016. The entire contents of the prior applications are incorporated herein by reference.

TECHNICAL FIELD

The present disclosure relates to an image forming apparatus provided with a foil transfer unit.

BACKGROUND

There is conventionally known an image forming apparatus including a toner image forming portion configured to form a toner image on a sheet, and a foil transfer unit configured to transfer a foil of gold color, silver color or white color onto the toner image formed on the sheet at the toner image forming portion, as described in US Patent Application publication No. US2012/0251174A1. According to the conventional image forming apparatus, the sheet is inserted into an interior of the apparatus from a near side of the apparatus. The sheet passes through the toner image forming portion and then passes through the foil transfer unit, and is discharged from the apparatus toward a far side of the apparatus.

SUMMARY

However, in the disclosed technique, operability is not satisfactory since the sheet is discharged from the far side in the apparatus even though the sheet insertion is performed from the near side.

In view of the foregoing, it is an object of the disclosure to provide an image forming apparatus capable of providing sufficient operability.

In order to attain the above and other objects, according to one aspect, the disclosure provides an image forming apparatus including a housing, a toner image forming portion, a foil transfer unit, a sheet tray, and a discharge portion. The toner image forming portion is provided in the housing and configured to form a toner image on a sheet. The foil transfer unit is configured to superpose a foil with a surface of the sheet on which the toner image is formed and to transfer the foil over the toner image. The sheet tray is installable in the housing in an inserting direction and configured to accommodate a sheet to be supplied to the toner image forming portion. The first discharge portion is configured to discharge the sheet from the foil transfer unit to the outside of the housing in a discharging direction opposite to the inserting direction. The second discharge portion is configured to discharge the sheet from the toner image forming portion to the outside of the housing without passing through the foil transfer unit in the discharging direction.

According to another aspect, the disclosure provides an image forming apparatus comprising a housing, a toner image forming portion, a foil transfer unit, a sheet tray, and a discharge portion. The toner image forming portion is provided in the housing and is configured to form a toner image on a sheet. The foil transfer unit is configured to superpose a foil with a surface of the sheet on which the toner image is formed and to transfer the foil over the toner image. The sheet tray is installable in the housing in an inserting direction and configured to accommodate a sheet to be supplied to the toner image forming portion. The discharge portion is configured to discharge the sheet from the foil transfer unit to the outside of the housing in a discharging direction opposite to the inserting direction and the sheet from the toner image forming portion to the outside of the housing without passing through the foil transfer unit in the discharge direction. The sheet from the foil transfer unit is discharged to the outside at a timing different from a timing of the discharge of the sheet from the toner image forming portion to the outside of the housing without passing through the foil transfer portion.

BRIEF DESCRIPTION OF THE DRAWINGS

The particular features and advantages of the embodiments as well as other objects will become apparent from the following description taken in connection with the accompanying drawings, in which:

FIG. 3(*b*) is a view illustrating a state where the support member is fallen forward from the state illustrated in FIG. 3(*a*);

DETAILED DESCRIPTION

Embodiments according to the present invention will be described with reference to the accompanying drawings.

First Embodiment

Figure 1:
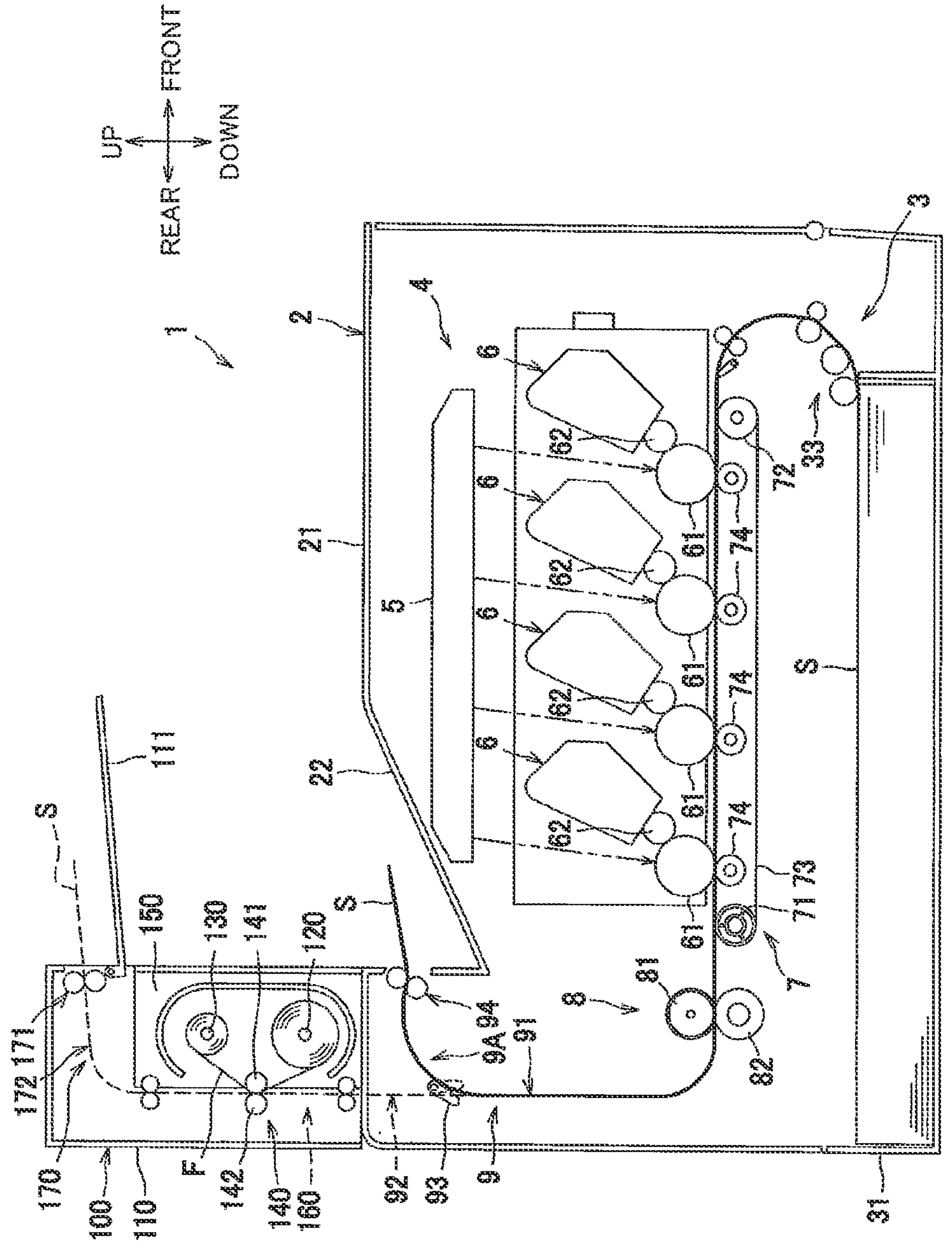
FIG. 1 is a schematic view illustrating a color printer according to a first embodiment of the present invention.

As illustrated in FIG. 1, a color printer 1 as an example of an image forming apparatus according to the present invention includes a main body 2, and a foil transfer unit 100 attachable to the main body 2. The following description will be described with reference to directions to define various parts when the color printer is disposed in an orientation in which it is intended to be used. That is, right side and left side in FIG. 1 will be referred to “front” side, and “rear” side, respectively, and near side and far side will be referred to “left” side and “right” side, respectively. Further, upward/downward direction in FIG. 1 will be referred to “upward/downward” direction The main body 2 includes a main housing 21. The foil transfer unit 100 is provided with a unit casing 110. The foil transfer unit 100 is attached to the main body 2 by fixing the unit casing 110 to the main housing 21. Thus, the housing of the color printer 1 is constituted by the main housing 21 and the unit casing 110.

The main body 2 generally includes a sheet supply portion 3, a toner image forming portion 4, and a conveying portion 9. The sheet supply portion 3, the toner image forming portion 4 and the conveying portion 9 are positioned inside the main housing 21.

The main housing 21 has an upper portion provided with a main discharge tray 22. The main discharge tray 22 is adapted to receive a sheet S as an example of a sheet discharged from a main discharge roller 94 of the conveying portion 9.

The sheet supply portion 3 is positioned at a lower portion of the main housing 21. The sheet supply portion 3 includes a sheet supply tray 31 in which sheets S to be supplied to the toner image forming portion 4 are accommodatable, and a sheet supply mechanism 33 including a sheet supply roller.

Figure 2:
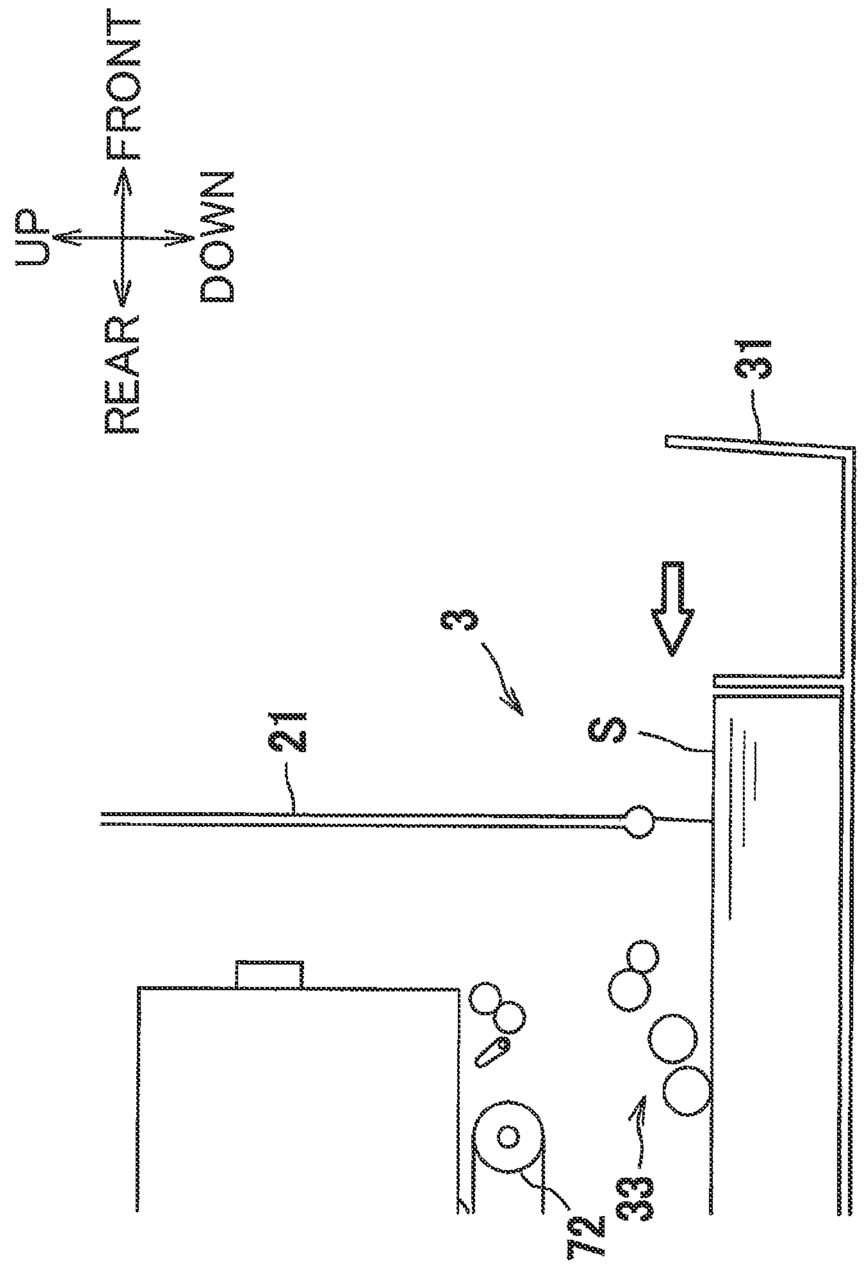
FIG. 2 is a view illustrating a state where a sheet supply tray is drawn out from a housing.

The sheet supply tray 31 is attachable to and detachable from the main housing 21. That is, the sheet supply tray 31 is attachable to and detachable from the housing of the color printer 1. Specifically, as illustrated in FIG. 2, the sheet supply tray 31 can be taken out from the main housing 21 by being drawn out frontward from the main housing 21. The sheet supply tray 31 can be attached to the main housing 21 by pushing rearward. That is, the sheet S can be inserted into the sheet supply portion 3 in a rearward direction.

Referring back to FIG. 1, the sheet supply portion 3 is adapted to supply the sheet S accommodated in the sheet supply tray 31 to the toner image forming portion 4 by the sheet supply mechanism 33.

The toner image forming portion 4 is adapted to form a toner image on the sheet S. The toner image forming portion 4 includes an exposure unit 5, four process units 6, a transfer unit 7, and a fixing unit 8.

The exposure unit 5 is positioned at an upper inner space of the main housing 21, and includes a laser emitting portion, a polygon mirror, lenses, and a reflection mirror those not illustrated. The exposure unit 5 is adapted to emit from the laser emitting portion laser beam (see two dotted chain lines) on a basis of image data to expose a surface of a photosensitive drum 61 of the process unit 6 to light.

The four process units 6 are positioned above the sheet supply portion 3 and are arrayed in a frontward/rearward direction. Each process unit 6 includes the photosensitive drum 61, a charger not illustrated, a developing roller 62, and a toner container adapted to accommodate therein toner.

The transfer unit 7 is positioned between the sheet supply portion 3 and the four process units 6. The transfer unit 7 includes a drive roller 71, a follower roller 72, a conveyer belt 73, and four transfer rollers 74.

The drive roller 71 and the follower roller 72 are spaced away from each other in the frontward/rearward direction and extend in parallel to each other. The conveyer belt 73 such as an endless belt is looped over the drive roller 71 and the follower roller 72 under tension. The conveyer belt 73 has an outer surface facing each photosensitive drum 61. The four transfer rollers 74 are positioned at an internal space defined by an inner surface of the conveyer belt 73, and each transfer roller 74 faces each photosensitive drum 61 to hold the conveyer belt 73 therebetween.

The fixing unit 8 is positioned rearward of the process unit 6 and the transfer unit 7. The fixing unit 8 includes a heat roller 81, and a pressure roller 82 facing the heat roller 81 and configured to press the heat roller 81.

In the toner image forming portion 4, each surface of each photosensitive drum 61 is exposed to light by the exposure unit 5 after being uniformly changed by the charger. Hence, electric charge at the exposed portion is removed to form an electrostatic latent image on a basis of the image data on each surface of the photosensitive drum 61. Thereafter, a toner image is formed on the surface of the photosensitive drum 61 by supplying toner from the toner container to the photosensitive drum 61 through the developing roller 62.

Then, the toner image formed on each sheet S is transferred to each photosensitive drum 61 by passing the sheet S supplied onto the conveyer belt 73 through a portion between each photosensitive drum 61 and each transfer roller 74. Then, the toner image transferred onto the sheet S is thermally fixed to the sheet by passing the sheet S through a portion between the heat roller 81 and the pressure roller 82.

The conveying portion 9 includes a main discharge portion 9A configured to discharge the sheet S fed out of the toner image forming portion 4 to an outside of the main housing 21 without being passed through a foil transfer portion 140 of the foil transfer unit 100, a connection passage 92 configured to guide the sheet S fed out of the toner image forming portion 4 to the foil transfer portion 140, and a flapper 93 configured to switch conveying direction of the sheet S.

The main discharge portion 9A includes a main discharge passage 91 along which the sheet S fed out of the fixing unit 8 is conveyed, and the main discharge roller 94.

The main discharge passage 91 extends upward from a rear side of the fixing unit 8, and extends frontward toward the main discharge tray 22 at an upper portion of the main housing 21.

The main discharge roller 94 is rollers positioned at an exit of the main discharge passage 91 and rearward of the main discharge tray 22. The main discharge roller 94 is configured to discharge the sheet S frontward toward the main discharge tray 22. That is, the discharging direction of the main discharge roller 94 is opposite to the inserting direction of the sheet S into the sheet supply tray 31. In other words, the discharging direction of the main discharge roller 94 is opposite to the attaching direction of the sheet supply tray 31 into the main housing 21.

The connection passage 92 is branched upward from the main discharge passage 91, and is communicated with the outside of the main housing 21.

The flapper 93 is positioned at a bifurcated portion of the main discharge passage 91 and the connection passage 92. The flapper 93 is pivotally movably supported to the main housing 21. The flapper 93 is switchable by its pivotal movement between a first position as indicated by a solid line where the main discharge passage 91 is opened while the connection passage 92 is closed and a second position as indicated by a broken line where the main discharge passage 91 is closed while the connection passage 92 is opened. The flapper 93 is configured to pivotally move to the first position in case foil transfer to the sheet S is not performed, and to the second position in case foil transfer to the sheet S is to be performed.

The foil transfer unit 100 further includes the foil transfer portion 140, a first reel 120, a second reel 130, a support member 150, a unit side discharge tray 111, a unit side sheet supply passage 160 and a unit side discharge portion 170.

The unit casing 110 is positioned above the main discharge portion 9A, and is fixed to an upper portion of the main housing 21. The unit casing 110 is provided on a rear portion of the main housing 21. That is, the foil transfer unit 100 is provided on the housing of the color printer 1 at a position upstream of a center portion of the housing of the color printer 1 in the discharging direction.

A foil tape F containing a foil prior to transfer is wound over the first reel 120. The foil tape F includes a tape like base and a foil layer formed on the base. The second reel 130 is positioned above the first reel 120. The foil tape F moved past the foil transfer portion 140 is wound over the second reel 130. The first reel 120 and the second reel 130 are positioned between the main discharge tray 22 and the unit side discharge tray 111.

The foil transfer portion 140 is at a height between a height of the first reel 120 and a height of the second reel 130. The foil transfer portion 140 includes a first foil transfer roller 141 and a second foil transfer roller 142 in confrontation with the first foil transfer roller 141 and in pressure contact therewith. The first foil transfer roller 141 is heated by a heat source not illustrated. The second foil transfer roller 142 is positioned rearward of the first foil transfer roller 141. The first foil transfer roller 141 and the second foil transfer roller 142 nip therebetween the foil tape wound over the first reel 120 and the second reel 130. The foil transfer portion 140 is configured to superpose the foil tape F with the toner image bearing surface of the sheet S guided by the unit side sheet supply passage 160, and to convey the sheet S upward. Thus, the foil transfer portion 140 transfers the foil onto the toner image by heating the toner image.

The unit side sheet supply passage 160 is adapted to guide the sheet S fed out of the connection passage 92 of the main housing 21 to the foil transfer portion 140. The unit side sheet supply passage 160 extends upward from a lower end of the unit casing 110 toward the foil transfer portion 140. The unit side sheet supply passage 160 has a lower end portion connected to the connection passage 92.

The unit side discharge portion 170 is adapted to discharge the sheet S fed out of the foil transfer portion 140 to the outside of the unit casing 110. The unit side discharge portion 170 includes a unit side discharge passage 172 and a unit side discharge roller 171.

The unit side discharge passage 172 is adapted to guide the sheet S fed out of the foil transfer portion 140 to the outside of the unit casing 110. The unit side discharge passage 172 extends upward from the foil transfer portion 140 and frontward at an upper portion of the unit casing 110.

The unit side discharge roller 171 is positioned at an exit of the unit side discharge passage 172, and is adapted to discharge the sheet S frontward. That is, the unit side discharge roller 171 is adapted to discharge the sheet S in the discharging direction of the main discharge roller 94. In other words, the unit side discharge portion 170 is adapted to discharge the sheet S in the direction opposite to the attaching direction of the sheet supply tray 31.

Figure 3A:
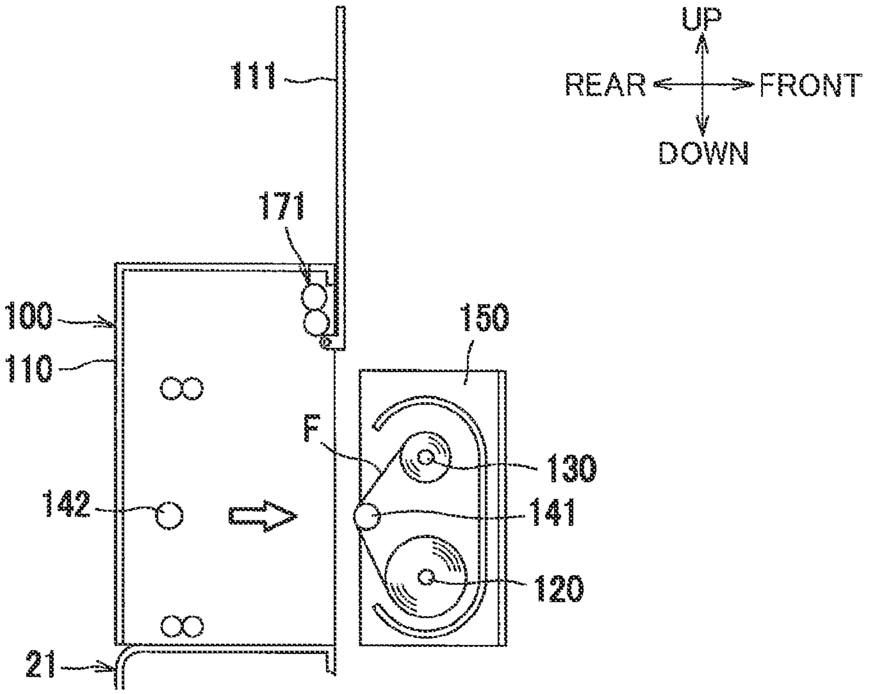
FIG. 3(*a*) is a view illustrating a state where a support member is drawn out from a unit casing in the color printer according to the first embodiment of the present invention.
Figure 3B:
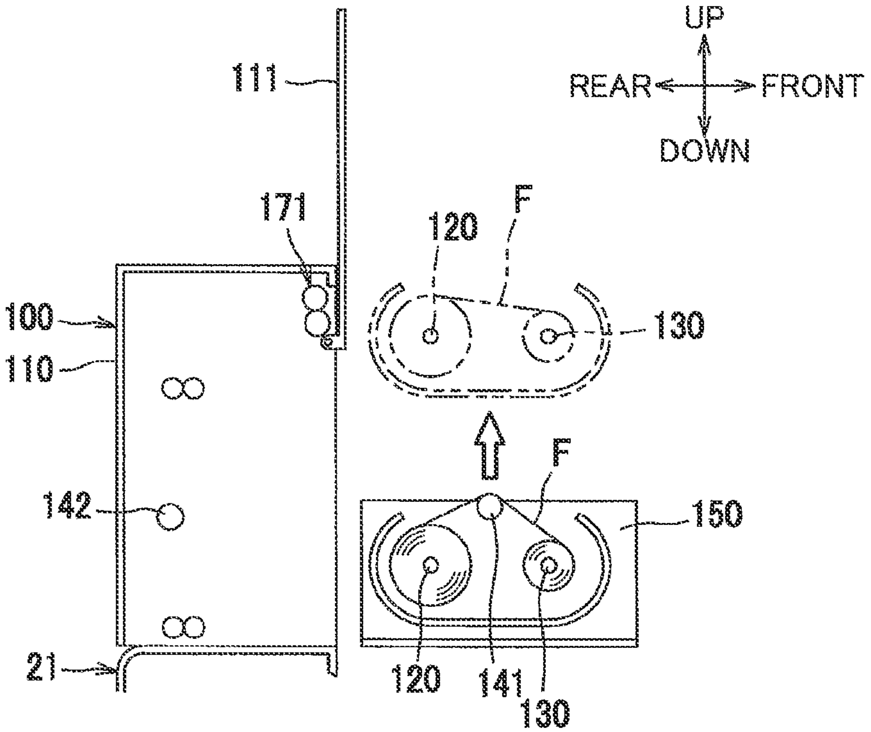

The unit side discharge tray 111 is adapted to receive the sheet S discharged from the unit side discharge roller 171. The unit side discharge tray 111 is positioned frontward of the unit side discharge roller 171 and extends in the frontward/rearward direction. The unit side discharge tray 111 is positioned above the main discharge tray 22. The unit side discharge tray 111 has a rear end portion pivotally movably supported to the unit casing 110. The unit side discharge tray 111 is pivotally movable upward as illustrated in FIG. 3(*a*) from a sheet receivable position illustrated in FIG. 1.

The support member 150 supports the first reel 120 and the second reel 130 such that these reels are attachable to and detachable from the support member 150. The support member 150 is attachable to and detachable from the unit casing 110 at a position below the unit side discharge roller 171. Specifically, as illustrated in FIG. 3(*a*), the support member 150 can be taken out from the unit casing 110 by being pulled out frontward. That is, the support member 150 can be taken out from the unit casing 110 in the discharging direction of the main discharge roller 94. Hence, the first reel 120 and the second reel 130 can be drawn out in the discharging direction of the main discharge roller 94 while passing through a portion between the main discharge tray 22 and the unit side discharge tray 111. Further, the support member 150 can be attached to the unit casing 110 by pushing the support member 150 rearward.

Function and effect of the color printer 1 thus constructed will be described.

As illustrated in FIG. 2, for inserting the sheet S into the sheet supply tray 31 of the sheet supply portion 3, the sheet supply tray 31 is drawn out from the front side of the color printer 1. After the sheet S is mounted on the sheet supply tray 31, the sheet supply tray 31 is inserted into the main housing 21 from the front side of the color printer 1.

For performing transfer of the foil to the sheet S, the conveying portion 9 pivotally moves to the second position as indicated by the broken line in FIG. 1. In the toner image forming portion 4, a toner image is formed on the sheet S fed out of the sheet supply tray 31 of the sheet supply portion 3, and the toner image to which the foil will be transferred is fixed to the sheet. The sheet S fed out of the toner image forming portion 4 is guided from the main discharge passage 91 to the connection passage 92 by the flapper 93 positioned at the second position, and is conveyed to the foil transfer unit 100. Then, the foil is transferred to the toner image on the sheet S when the sheet S passes through the foil transfer portion 140. The sheet S moved past the foil transfer portion 140 passes through the unit side discharge passage 172 and is discharged frontward from the unit casing 110 by the unit side discharge roller 171. The sheet S discharged by the unit side discharge roller 171 is mounted on the unit side discharge tray 111 positioned frontward of the unit casing 110. Therefore, a user can take out the sheet S discharged from the foil transfer unit 100 at the front side of the color printer 1.

In a case where the foil transfer is not to be performed, the flapper 93 pivotally moves to the first position as indicated by the solid line in FIG. 1. In the toner image forming portion 4, toner image is formed on the sheet S fed out of the sheet supply tray 31 of the sheet supply portion 3, and the toner image is fixed to the sheet. The sheet S fed out of the toner image forming portion 4 is conveyed along the main discharge passage 91 by the flapper 93 positioned at the first position and is discharged frontward by the main discharge roller 94. The sheet S discharged by the main discharge roller 94 is mounted on the main discharge tray 22. The user can take out the sheet S discharged from the main body 2 at the front side of the color printer 1.

As described above, according to the color printer 1, the user's operation can be made at the front side of the color printer 1 in case of not only insertion of the sheet S into the sheet supply tray 31 but also take-out of the sheet S discharged onto the main discharge tray 22 or unit side discharge tray 111. Accordingly, excellent operability can be provided for the user.

In case of replacement of the foil tape F with a new foil tape, the unit side discharge tray 111 is pivotally moved upward as illustrated in FIG. 3(*a*) to provide a wide space in front of the support member 150. Then, the support member 150 is drawn out frontward relative to the unit casing 110. Then, the support member 150 is fallen forward as illustrated in FIG. 3(*b*). Hence, the first reel 120 and the second reel 130 are exposed to the outside, facilitating take-out of the first reel 120 and the second reel 130 from the support member 150. Thus, the foil tape F can be exchanged with the new foil tape. In this way, user's operation can be performed at the front side of the color printer 1 in case of replacement of the foil tape F also.

The first embodiment according to the present invention is described above. The present invention is not limited to the above-described embodiment. Various modifications may be made without departing from the scope of the invention. Incidentally, in the following modifications, like parts and components are designated by the same reference numerals as those shown in the above-described embodiment to avoid duplicating description.

According to the above-described embodiment, the foil transfer portion 140 is provided in the foil transfer unit 100 attachable to the main housing 21. However, the foil transfer portion is not limited to the above-described structure. For example, the foil transfer portion may be provided inside the main housing 21.

Figure 4:
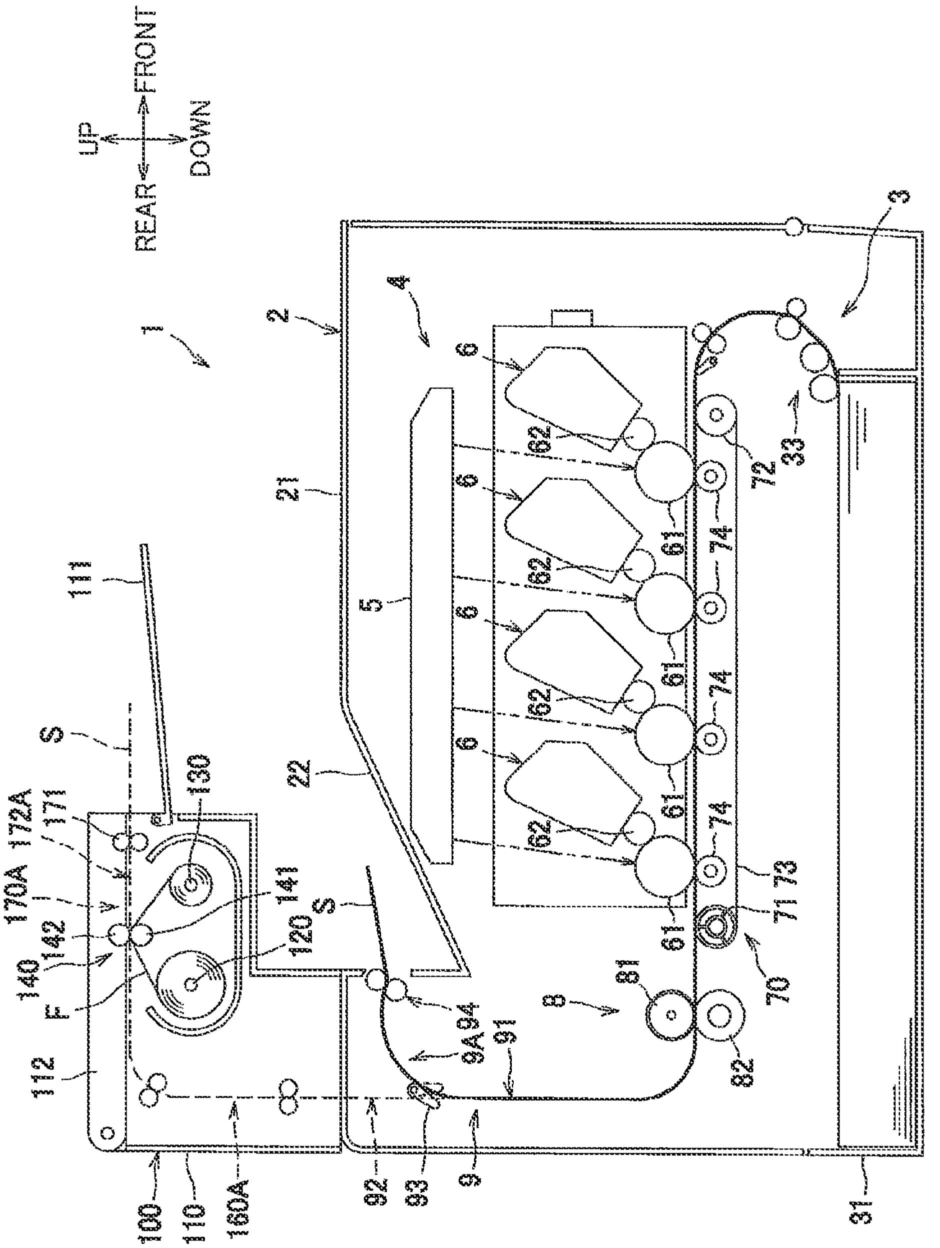
FIG. 4 is a schematic view illustrating a color printer according to a modification to the first embodiment of the present invention.

According to the above-described embodiment, the foil transfer portion 140 is adapted to covey the sheet S upward. However, the foil transfer portion is not limited to the above-described structure. For example, as illustrated in FIG. 4, the foil transfer portion 140 is configured to convey the sheet S frontward which is the discharging direction of the main discharge roller 94.

Specifically, the second reel 130 is positioned frontward of the first reel 120, and the first foil transfer roller 141 is positioned between the first reel 120 and the second reel 130 in the frontward/rearward direction. The second foil transfer roller 142 is positioned above the first foil transfer roller 141.

In this modification, the foil transfer unit 100 includes a unit side sheet supply passage 160A and a unit side discharge portion 170A instead of the unit supply passage 160 and the unit side discharge portion 170. The unit side sheet supply passage 160A extends upward from the upper end of the connection passage 92, and extends frontward toward the foil transfer portion 140.

The unit side discharge portion 170A is adapted to discharge the sheet S fed out of the foil transfer portion 140 to the outside of the unit casing 110. The unit side discharge portion 170A includes a unit side discharge passage 172A and a unit side discharge roller 171.

The unit side discharge passage 172A extends linearly frontward from the foil transfer portion 140. The unit side discharge roller 171 is configured to discharge the sheet S fed out of the foil transfer portion 140 frontward. Thus, in the foil transfer unit 100, the sheet S moved past the foil transfer portion 140 is conveyed linearly frontward and is discharged frontward. In this way, since foil transfer is performed while the sheet S is conveyed linearly, curling of the sheet S can be restrained. Further, since the sheet S fed out of the foil transfer portion 140 can be conveyed linearly, curling of the sheet S can be restrained.

Figure 5:
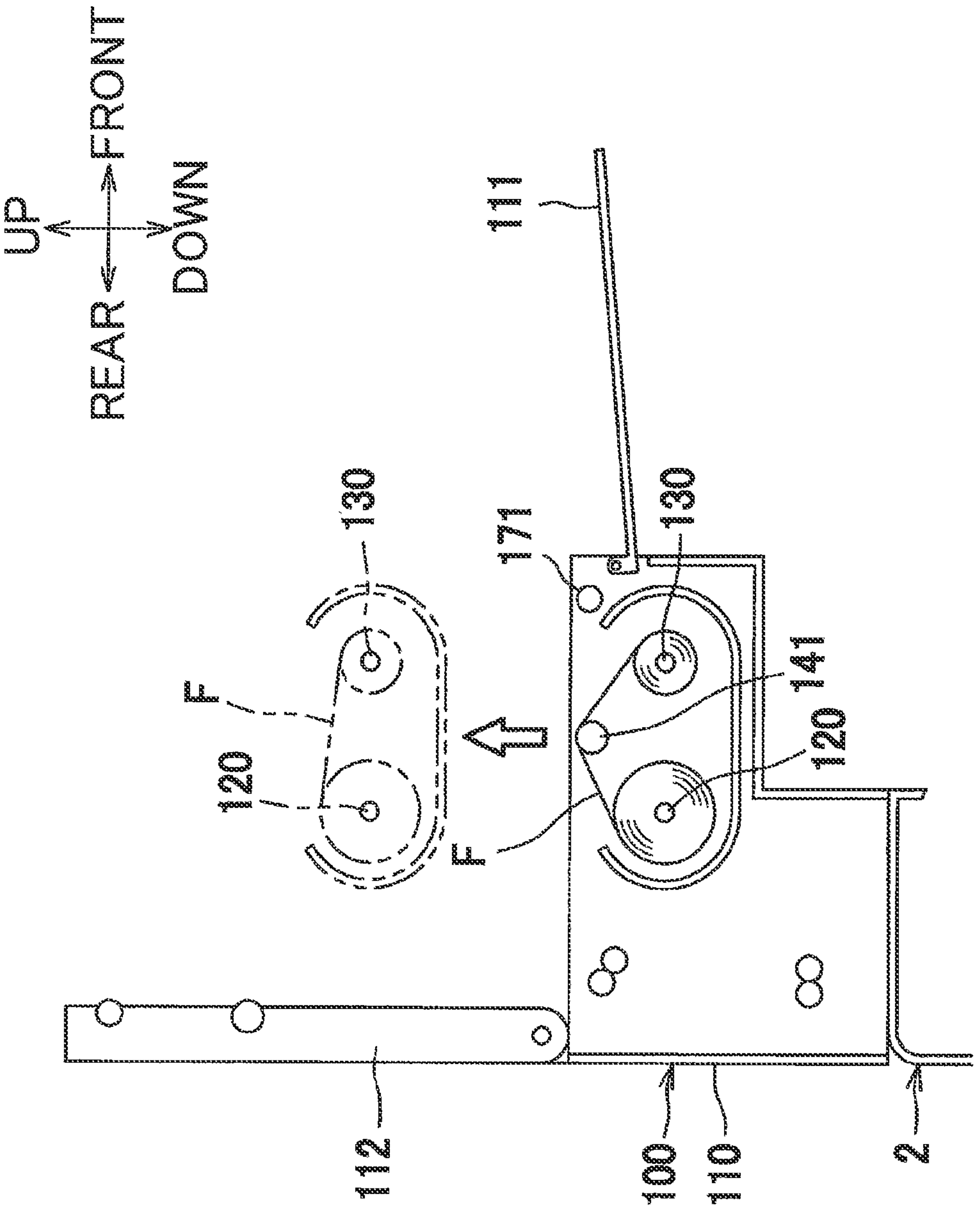
FIG. 5 is a view illustrating a state where a top cover of a foil transfer unit is open in the modification to the first embodiment.

In the foil transfer unit 100, a top cover 112 is provided for opening and closing an upper portion of the unit casing 110. The top cover 112 has a rear end portion supported to the unit casing 110 so that the top cover 112 is pivotally movable in the upward/downward direction. As illustrated in FIG. 5, for exchanging the foil tape F with the new foil tape, the top cover 112 is pivotally moved upward so as to expose the first reel 120 and the second reel 130 to the outside. With the exposed state, the first reel 120 and the second reel 130 are detached from the unit casing 110 for replacing the foil tape F.

Figure 6:
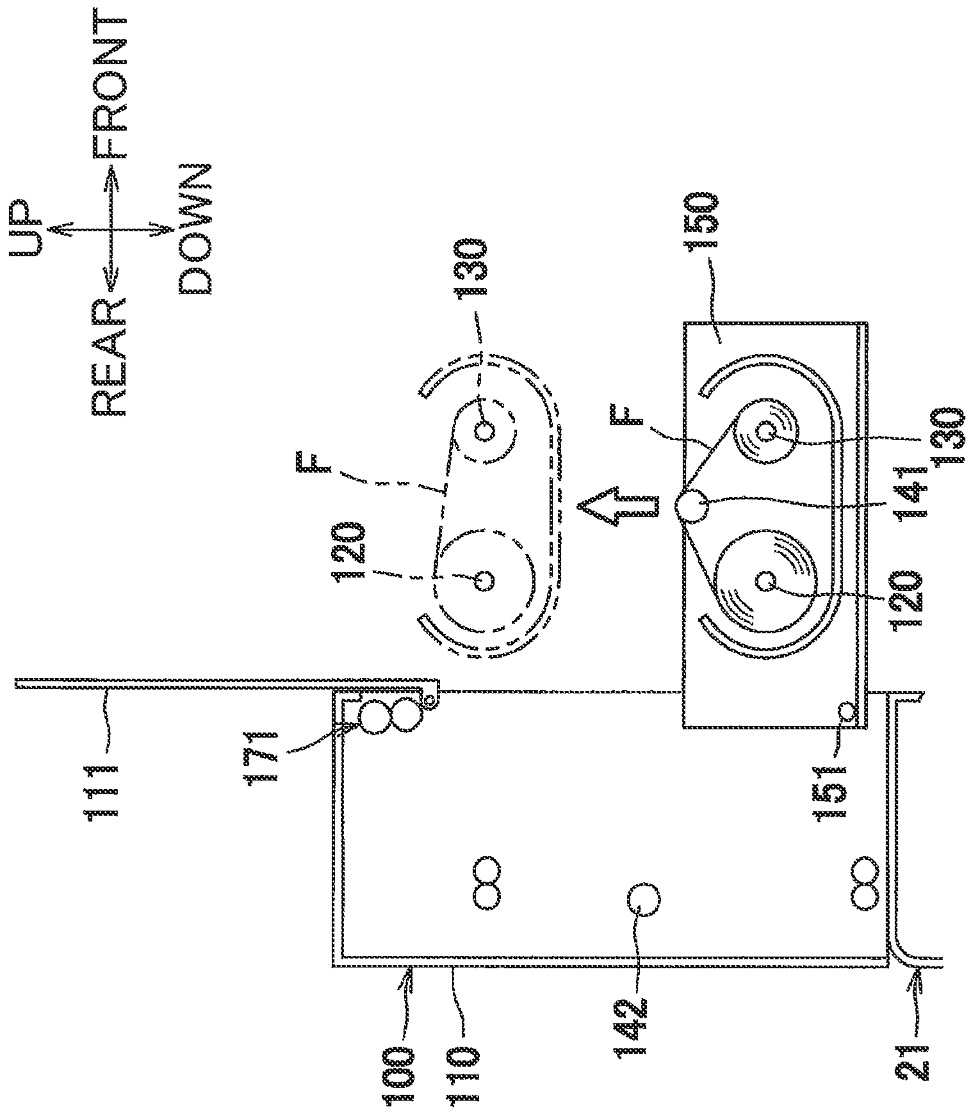
FIG. 6 is a view illustrating a modification to the support member.

According to the above-described embodiment, the support member 150 can be drawn out frontward from the unit casing 110. However, the support member 150 is not limited to the above-described structure. For example, the support member 150 may be pivotally movably supported to the unit casing 110 as illustrated in FIG. 6.

Specifically, the support member 150 has a lower end portion provided with a pivot shaft 151. The support member 150 is pivotally movably supported to the unit casing 110 through the pivot shaft 151.The first reel 120 and the second reel 130 are exposed to the outside by pivotally moving the support member 150 frontward. Also in this case, the support member 150 can be drawn out in the discharging direction of the main discharge roller 94 with the support member 150 passing through a portion between the main discharge tray 22 and the unit side discharge tray 111.

Second Embodiment

A second embodiment will next be described, wherein like parts and components are designated by the same reference numerals as those shown in the foregoing embodiment to avoid duplicating description.

Figure 7:
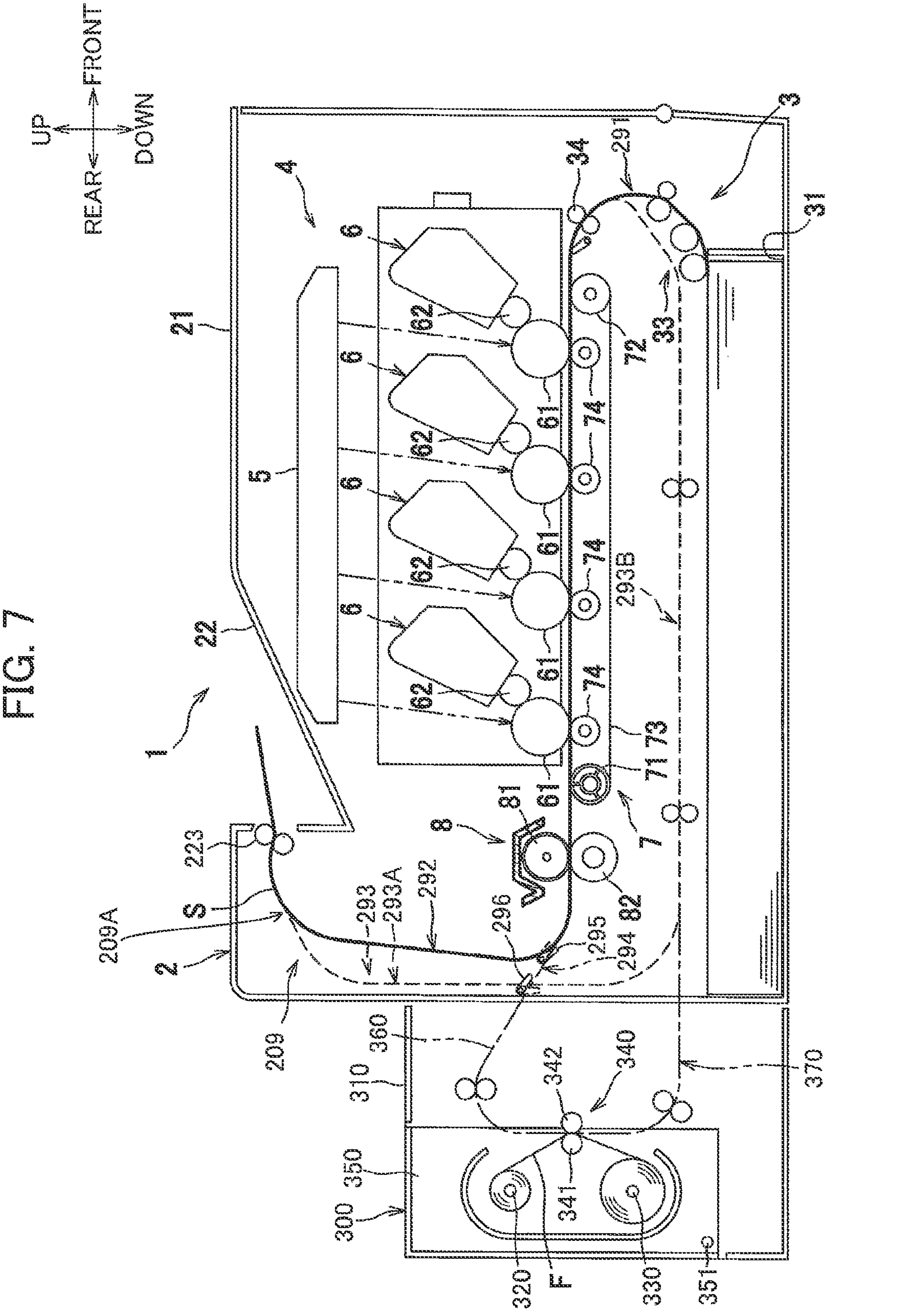
FIG. 7 is a schematic view illustrating a color printer according to a second embodiment of the present invention.

A color printer 1 according to the second embodiment includes a conveying portion 209 instead of the conveying portion 9. As illustrated in FIG. 7, the conveying portion 209 is positioned inside the main housing 21. The conveying portion 209 includes a first passage 291, a second passage 292, a re-conveying passage 293, a third passage 294, and a first flapper 295 as an example of a first switch member, a second flapper 296 as an example of a second switch member, and a discharge portion 209A. Further, the color printer 1 according to the second embodiment includes a foil transfer unit 300 instead of the foil transfer unit 100.

The first passage 291 is adapted to guide the sheet S fed out of the sheet supply portion 3 to the toner image forming portion 4. The first passage 291 extends diagonally upward and frontward from the upper front portion of the sheet supply tray 31, and then extends diagonally upward and rearward.

The second passage 292 is adapted to guide the sheet S fed out of the toner image forming portion 4 to the main discharge tray 22. The second passage 292 extends upward from the rear side of the fixing unit 8 and then extends frontward toward the main discharge tray 22 at the upper portion of the main housing 21.

The re-conveying passage 293 is adapted to guide the sheet S fed out of the toner image forming portion 4 to the toner image forming portion 4 again. The re-conveying passage 293 is branched from the second passage 292 and joined to the first passage 291 without being passed through the foil transfer unit 300.

Specifically, the re-conveying passage 293 includes a first re-conveying passage 293A adapted to guide the sheet S to a position lower than the toner image forming portion 4, and a second re-conveying passage 293B adapted to guide the sheet guided by the first re-conveying passage 293A to the first passage 291 at a position below the toner image forming portion 4. The first re-conveying passage 293A extends rearward from the upper portion of the second passage 292, and then extends downward at a position rearward of the second passage 292 to a position between the conveyer belt 73 and the sheet supply tray 31 in the upward/downward direction. The second re-conveying passage 293B extends frontward from a lower end of the first re-conveying passage 293A at a position between the conveyer belt 73 and the sheet supply tray 31, and is joined to the first passage 291 at a position downstream of the sheet supply mechanism 33 and upstream of a registration roller 34. Incidentally, the second re-conveying passage 293B may be positioned below the sheet supply tray 31.

The third passage 294 is adapted to guide the sheet S fed through the second passage 292 to a unit side sheet supply passage 360 positioned outside of the main housing 21. The third passage 294 is branched rearward from the second passage 292 at a position closer to the fixing unit 8 than a branching portion of the re-conveying passage 293 from the second passage 292 is to the fixing unit 8. The third passage 294 extends rearward to the rear end of the main housing 21 crossing the first re-conveying passage 293A, and is connected to the unit side sheet supply passage 360 of the foil transfer unit 300.

The first flapper 295 is positioned at a branching portion of the second passage 292 and the third passage 294. The first flapper 295 is pivotally movably supported to the main housing 21. The first flapper 295 is switchable between a first position (indicated by a solid line) and a second position (indicated by a broken line) in accordance with the pivotal movement. At the first position, the first flapper 295 closes the third passage 294 while the first flapper 295 guides the sheet S conveyed through the second passage 292 toward the main discharge tray 22. At the second position, the first flapper 295 closes the second passage 292 while the first flapper 295 guides the sheet S conveyed through the second passage 292 to the third passage 294, that is, toward the unit side sheet supply passage 360.

The second flapper 296 is positioned at a branching portion of the third passage 294 and the first re-conveying passage 293A. The second flapper 296 is pivotally movably supported to the main housing 21. The second flapper 296 is switchable between a third position (indicated by a solid line) and a fourth position (indicated by a broken line) in accordance with the pivotal movement. At the third position, the second flapper 296 closes the first re-conveying passage 293A while the second flapper 296 guides the sheet S conveyed through the third passage 294 toward the unit side sheet supply passage 360. At the fourth position, the second flapper 296 closes the third passage 294 while the second flapper 296 guides the sheet S conveyed along the first re-conveying passage 293A.

The discharge portion 209A includes a discharge roller 223. The discharge roller 223 is positioned closer to the main discharge tray 22 than the branching portion of the second passage 292 and the re-conveying passage 293 is to the main discharge tray 22. Positive rotation of the discharge roller 223 conveys the sheet S fed out of the fixing unit 8 to the outside of the main housing 21, and reverse rotation of the discharge roller 223 conveys the sheet S back into the interior of the main housing 21. That is, the sheet discharging direction of the discharge roller 223 is opposite to the attaching direction of the sheet supply tray 31 to the main housing 21.

The foil transfer unit 300 includes a unit casing 310, a first reel 320, a second reel 330, a foil transfer portion 340, and a support member 350. The foil transfer unit 300 further includes the unit side sheet supply passage 360 and a unit side discharge passage 370.

The unit casing 310 is fixed to a rear end portion of the main housing 21. The unit casing 310 accommodates therein the foil transfer portion 340, the first reel 320, and the second reel 330.

A foil tape F having a foil prior to transfer is wound over the first reel 320. The foil tape F includes a base tape and a foil layer formed over the base tape. The second reel 330 is positioned below the first reel 320. The foil tape F moved past the foil transfer portion 340 is wound over the second reel 330.

The foil transfer portion 340 is positioned between the first reel 320 and the second reel 330 in the vertical direction. The foil transfer portion 340 includes a first foil transfer roller 341, a second foil transfer roller 342 positioned in confrontation with the first foil transfer roller 341 and pressing the first foil transfer roller 341. The first foil transfer roller 341 is heated by a heat source not illustrated. According to this embodiment, the foil transfer portion 340 is at a position higher than the second re-conveying passage 293B. The foil transfer portion 340 is adapted to superpose the foil of the foil tape F with the toner imaged surface of the sheet S guided by the unit side sheet supply passage 360, and to convey the sheet S vertically downward.

The unit side sheet supply passage 360 is connected to the second passage 292 and is adapted to guide the sheet S conveyed along the second passage 292 to the foil transfer portion 340. In this embodiment, the unit side sheet supply passage 360 is connected to the third passage 294 to guide the sheet S conveyed along the third passage 294 to the foil transfer portion 340. The unit side sheet supply passage 360 extends diagonally upward and rearward from the third passage 294, and then extends downward. The unit side sheet supply passage 360 is configured to guide the sheet S to a position above the foil transfer portion 340 and then guide the sheet S downward toward the foil transfer portion 340.

The unit side discharge passage 370 is connected to the first passage 291 to guide the sheet S fed out of the foil transfer portion 340 to the first passage 291. In this embodiment, the unit side discharge passage 370 extends downward from the foil transfer portion 340, and then extends frontward to join the second re-conveying passage 293B.

In this embodiment, the first reel 320 and the second reel 330 are positioned opposite to the toner image forming portion 4 with respect to the unit side sheet supply passage 360 and the unit side discharge passage 370. The first reel 320 and the second reel 330 are attachable to and detachable from the support member 350.

Figure 8:
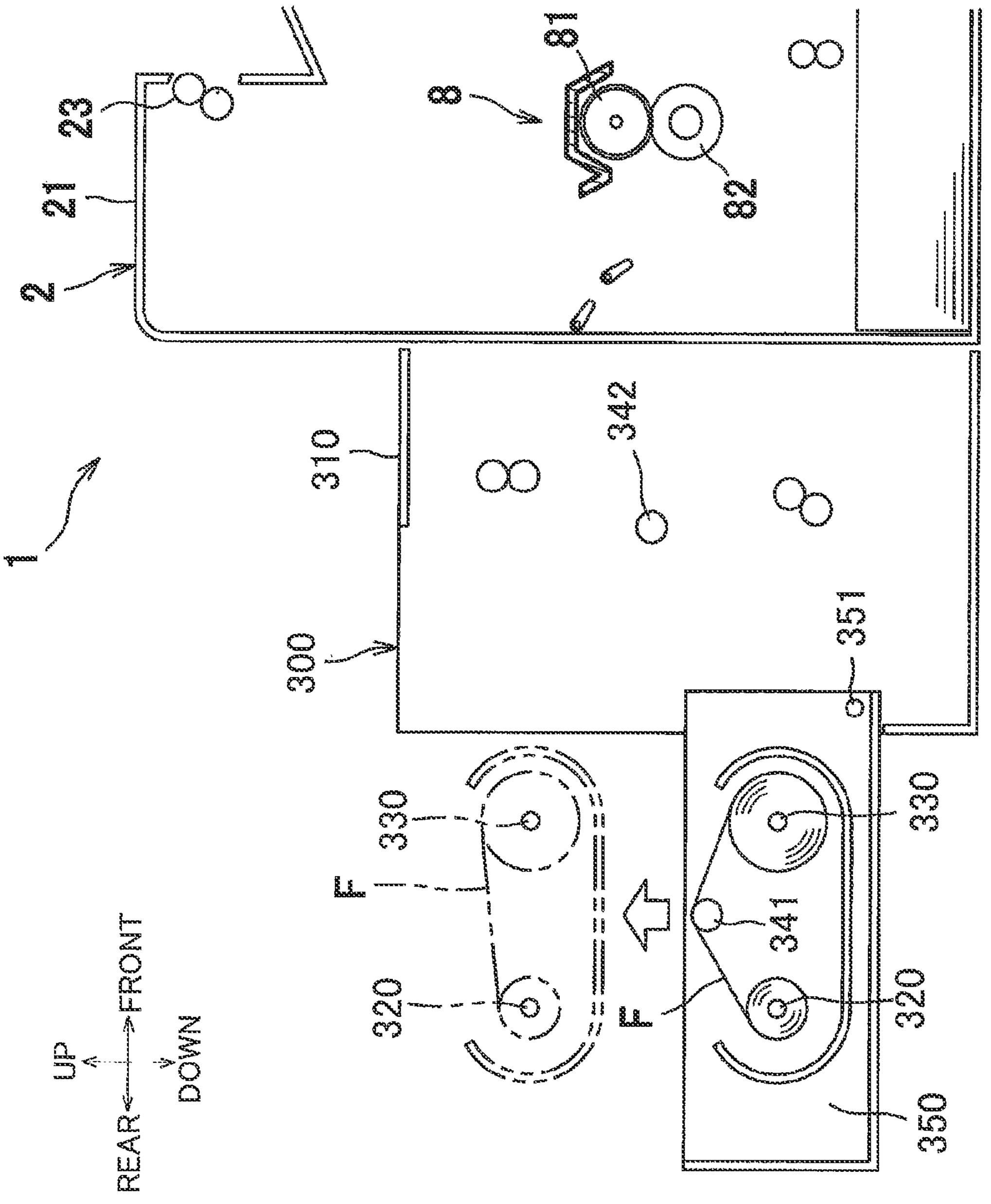
FIG. 8 is a view illustrating a foil transfer unit for description of exchange of a first reel and a second reel with new reels in the color printer according to the second embodiment of the present invention.

The support member 350 rotatably supports the first reel 320 and the second reel 330 with the first reel 320 and the second reel 330 being attached to the support member 350. As illustrated in FIG. 8, the support member 350 is supported to the unit casing 310 and is pivotally movable about a pivot shaft 351. Hence, the support member 350 is pivotally movable relative to the main housing 21. The support member 350 is pivotally movable in a direction away from the main housing 21, which is rearward, to expose the first reel 320 and the second reel 330 to the outside. Thus, the first reel 320 and the second reel 330 over which the foil tape F is wound are exchangeable with new reels by a simple operation.

Function and effect of the color printer 1 thus constructed will next be described.

For performing transfer of the foil to the sheet S, as illustrated in FIG. 7, firstly, the first flapper 295 is pivotally moved to the second position to close the second passage 292 and open the third passage 294. Further, the second flapper 296 is pivotally moved to the third position to close the first re-conveying passage 293A and open the third passage 294. The sheet S supplied from the sheet supply tray 31 is subjected to toner image formation at the toner image forming portion 4, and the toner image is fixed to the sheet S. The sheet S fed out of the toner image forming portion 4 is conveyed from the second passage 292 to the third passage 294 by the first flapper 295 positioned at the second position. The sheet S conveyed along the third passage 294 is conveyed to the unit side sheet supply passage 360 and is supplied to the foil transfer portion 340. The foil is transferred onto the toner image formed on the sheet S by passing the sheet S through the foil transfer portion 340. The sheet S moved past the foil transfer portion 340 is conveyed to the second re-conveying passage 293B by way of the unit side discharge passage 370. In this case, the first flapper 295 is pivotally moved to the first position to close the third passage 294 and open the second passage 292. Thereafter, the sheet S is again passed through the toner image forming portion 4. In case another toner image is to be formed and the transfer of the foil to the other toner image is not necessary, the other toner image is formed on the sheet S and the toner image is fixed to the sheet S. The sheet S moved past the toner image forming portion 4 is conveyed along the second passage 292 and is discharged onto the main discharge tray 22 by the discharge roller 223 rotating in positive rotational direction. That is, the discharge roller 223 as the discharge portion discharges the sheet S in the discharging direction opposite to the attaching direction of the sheet supply tray 31.

In case the foil transfer is not required, firstly, the first flapper 295 is moved to the first position to close the third passage 294 and open the second passage 292. Further, the discharge roller 223 is rotated in the positive rotational direction. The sheet S supplied from the sheet supply tray 31 of the sheet supply portion 3 is subjected to toner image formation at the toner image forming portion 4, and the toner image is fixed to the sheet S. The sheet S formed with the toner image is conveyed along the second passage 292 and is conveyed toward the main discharge tray 22 by the discharge roller 223 rotating on the positive rotational direction.

In this way, if the foil transfer is not to be performed, since the sheet S fed out of the toner image forming portion 4 is discharged without passing through the foil transfer unit 300, a time period from the start of printing to the discharge of the sheet can be shortened. Additionally, in this embodiment, the sheet S from the foil transfer unit 340 is discharged to the outside of the unit casing 310 at a timing different from a timing of the discharge of the sheet S from the toner image forming portion 4 to the outside of the unit casing 310 without passing through the foil transfer portion 340.

Incidentally, if image formation is required on an opposite surface of the sheet S whose one surface has been formed with the image, the discharge roller 223 nipping the tail end portion of the sheet S is reversely rotated before the sheet S in its entirety is completely discharged outside of the main housing 21 to bring back the sheet S into the interior of the main housing 21. Further, the second flapper 296 is pivotally moved to the fourth position to close the third passage 294 and open the first re-conveying passage 293A. The sheet S brought back into the main housing 21 by the reversely rotating discharge roller 223 is conveyed from the second passage 292 to the first passage 291 through the re-conveying passage 293.

According to this embodiment, since the first flapper 295 is provided at the branching portion of the second passage 292 and the third passage 294, the sheet S conveyed along the re-conveying passage 293 can be conveyed toward the main discharge tray 22 for discharging the sheet S, or can be conveyed toward the foil transfer unit 300 for performing foil transfer. Thus, the sheet S can be promptly discharged without being passed through the foil transfer unit 300 in case where the foil transfer is not to be performed.

Further, since the second flapper 296 is provided at the branching portion of the third passage 294 and the first re-conveying passage 293A, the sheet S conveyed along the third passage 294 or along the first re-conveying passage 293A can be conveyed to an intended location without being caught at the branching portion of the third passage 294 and the first re-conveying passage 293A.

While the invention has been described with reference to the embodiments, the present invention is not limited to the above-described embodiments, but various modifications may be made without departing from the scope of the invention. In the modifications, like parts and components are designated by the same reference numerals as those shown in the above-described embodiments to avoid duplicating description.

In the above-described embodiments, the foil transfer unit 300 is attachable to the outer side of the main body 2. However, the foil transfer unit is not limited to this structure. For example, the foil transfer unit may be positioned inside the main housing 21.

Figure 9:
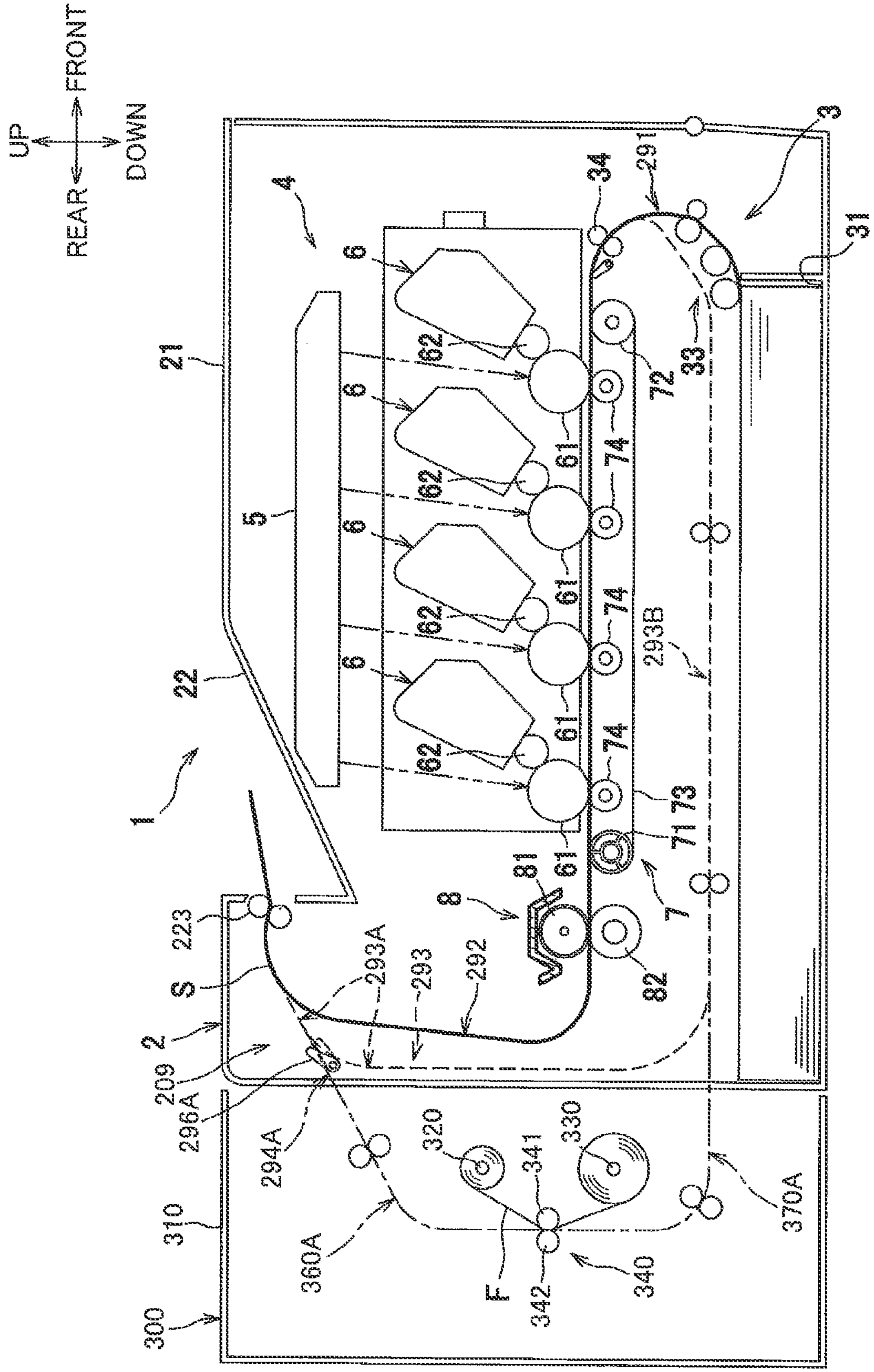
FIG. 9 is a view illustrating a first modification to the second embodiment.

In the above-described embodiment, the unit side sheet supply passage 360 is connected to the third passage 294 branched from the second passage 292. However, the unit side sheet supply passage is not limited to this structure. For example, as illustrated in FIG. 9, a unit side sheet supply passage 360A may be connected to a fourth passage 294A branched from the re-conveying passage 293.

The fourth passage 294A is branched from the first re-conveying passage 293A and extends toward the rear end of the main housing 21.

In this modification, the discharge roller 223 functions as the switch member. Specifically, regular rotation of the discharge roller 223 guides the sheet S conveyed along the second passage 292 to the main discharge tray 22, and reverse rotation of the discharge roller 223 guides the sheet S conveyed along the second passage 292 to the first re-conveying passage 293A, that is, to the unit side sheet supply passage 360A.

A second flapper 296A is positioned at a branching portion of the first re-conveying passage 293A and the fourth passage 294A. The second flapper 296A is switchable by its pivotal movement between a position (indicated by a solid line) where the sheet S conveyed along the first re-conveying passage 293A is guided to the second re-conveying passage 293B and a position (indicated by a broken line) where the sheet S conveyed along the first re-conveying passage 293A is guided to the fourth passage 294A.

In this case, for performing foil transfer, the sheet S fed out of the fixing unit 8 is temporarily conveyed to the outside of the main housing 21 by the discharge roller 223 rotating in the positive rotational direction, and then, the sheet S is conveyed to the first re-conveying passage 293A by the reversal rotation of the discharge roller 223. Then, the sheet S is conveyed from the first re-conveying passage 293A to the unit side sheet supply passage 360A by way of the fourth passage 294A. The sheet S fed out of the foil transfer portion 340 is conveyed along a unit side discharge passage 370A and is conveyed to the second re-conveying passage 293B.

According to this modification, the first reel 320 and the second reel 330 are positioned at the side the same as the toner image forming portion 4 with respect to the foil transfer portion 340, since the front and back of the sheet S conveyed through the foil transfer portion 340 in this modification is reversed in this modified embodiment.

Figure 10:
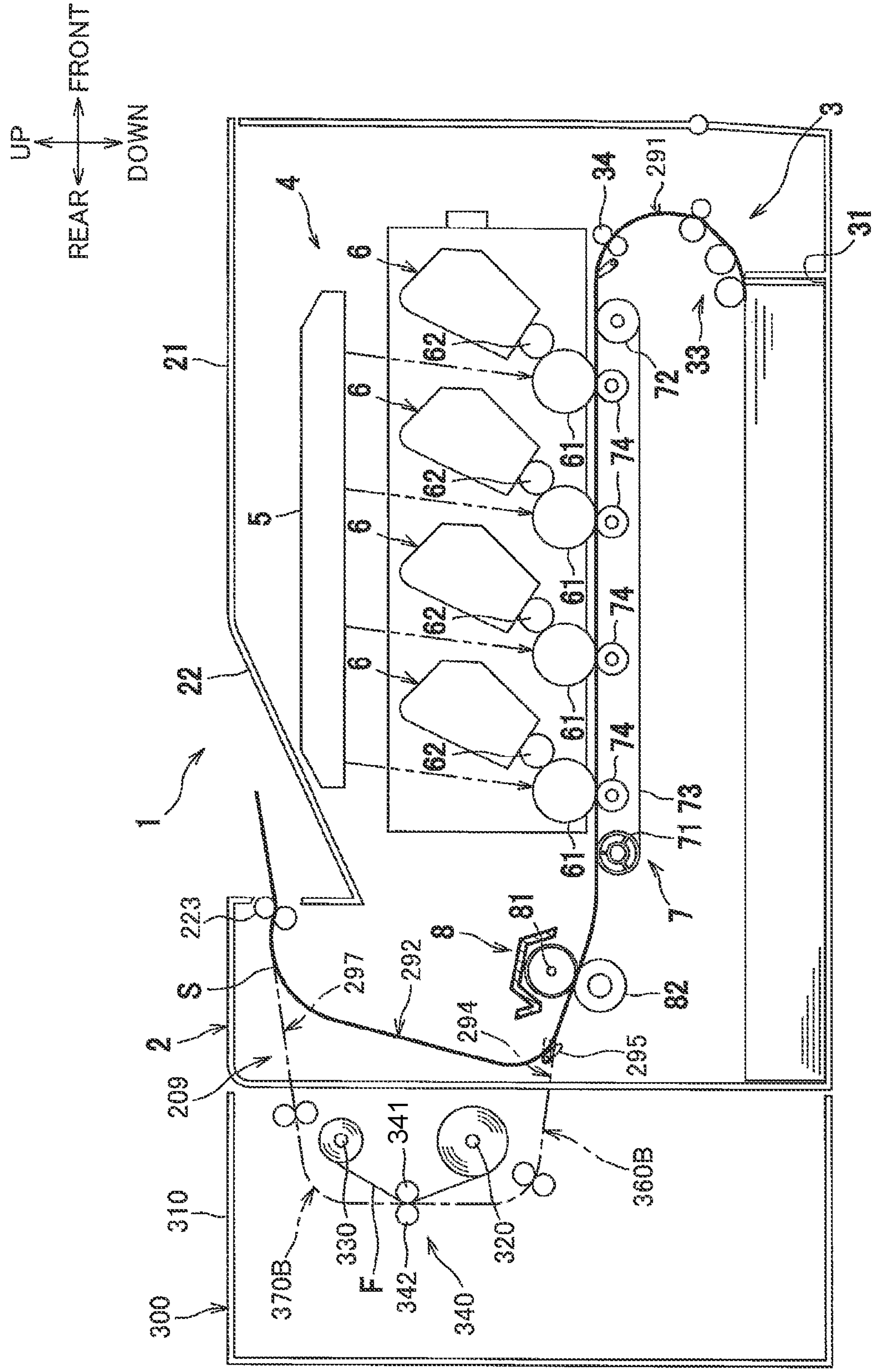
FIG. 10 is a view illustrating a second modification to the second embodiment.

According to the second embodiment, the unit side discharge passage 370 is connected to the first passage 291 by way of the second re-conveying passage 293B to guide the sheet fed out of the foil transfer portion 340 to the first passage 291. However, the unit side discharge passage is not limited to this structure. For example, as illustrated in FIG. 10, a unit side discharge passage 370B is connected to the second passage 292 so as to guide the sheet S fed out of the foil transfer portion 340 to the second passage 292.

Specifically, the conveying portion 209 extends frontward from the rear end of the main housing 21 and includes a fifth passage 297 joined to the second passage 292 at a position closer to the discharge roller 223 than a joining portion of the third passage 294 and the second passage 292 is to the discharge roller 223. The foil transfer portion 340 is positioned above the third passage 294. A unit side sheet supply passage 360B extends rearward from the third passage 294, and then extends upward toward the foil transfer portion 340. The unit side discharge passage 370B extends upward from the foil transfer portion 340, and then extends frontward to be connected to the fifth passage 297.

According to the color printer 1 thus constructed, for performing foil transfer, the sheet S fed out of the fixing unit 8 is conveyed to the foil transfer portion 340 by way of the unit side sheet supply passage 360B, and then, conveyed to the second passage 292 by way of the unit side discharge passage 370B and the fifth passage 297 for discharging the sheet S.

According to the first embodiment and the second embodiment, the color printer 1 as the image forming apparatus includes the plurality of process units 6. However, the image forming apparatus is not limited to the printer. For example, a monochromatic laser printer including a single process unit is also available as the image forming apparatus.

What is claimed is:

1. An image forming apparatus comprising:
- a housing;
- a toner image forming portion provided in the housing and configured to form a toner image on a sheet;
- a foil transfer unit configured to superpose a foil with a surface of the sheet on which the toner image is formed and to transfer the foil over the toner image; and
- a sheet tray installable in the housing and configured to accommodate a sheet to be supplied to the toner image forming portion,
- wherein the housing includes a single discharge tray configured to receive the sheet from the foil transfer unit, and configured to receive the sheet that has been fed out of the toner image forming portion without passing through the foil transfer unit,
- wherein the foil transfer unit comprises:
  - a foil transfer portion;
  - an inlet passage configured to guide the sheet fed out of the toner image forming portion to the foil transfer portion; and
  - an outlet passage configured to guide the sheet moved past the foil transfer portion, and
- wherein the image forming apparatus further comprises:
  - a first passage configured to guide the sheet fed out of the sheet tray to the toner image forming portion;
  - a second passage configured to guide the sheet fed out of the toner image forming portion to the discharge tray, the second passage being connected to the inlet passage so that the sheet conveyed through the second passage is capable of being moved into the inlet passage, the outlet passage being connected to at least one of the first passage and the second passage so that the sheet conveyed through the outlet passage is capable of being moved into one of the first passage and the second passage; and
  - a switch member switchable between a first state in which the sheet conveyed through the second passage is guided to the discharge tray and a second state in which the sheet conveyed through the second passage is guided to the inlet passage.

2. The image forming apparatus according to claim 1, further comprising:
- a re-conveying passage branched from the second passage and joined to the first passage without passing through the foil transfer portion so as to guide the sheet fed out of the toner image forming portion toward the toner image forming portion, the re-conveying passage being connected to the outlet passage, so that the sheet moved past the foil transfer portion is capable of being moved into the re-conveying passage,
- the switch member being located at a position where the second passage is connected to the inlet passage.

3. The image forming apparatus according to claim 2, further comprising:
- an additional passage branched from the second passage and connected to the inlet passage, the additional passage crossing the re-conveying passage,
- wherein the switch member includes:
  - a first switch member located at a position where the additional passage is branched from the second passage and switchable between a third guiding position to guide the sheet passing through the second passage to the discharge tray and a fourth guiding position to guide the sheet passing through the second passage into the additional passage; and
  - a second switch member located at a position where the additional passage crosses the re-conveying passage and switchable between a first guiding position to guide the sheet passing through the additional passage to the inlet passage and a second guiding position to guide the sheet passing through the re-conveying passage.

4. The image forming apparatus according to claim 2, wherein the foil transfer unit further comprises:
- a first reel on which a foil prior to transferring is wound; and
- a second reel configured to take-up a foil passed through the foil transfer portion, the first reel and the second reel being positioned opposite to the toner image forming portion with respect to the inlet passage and the outlet passage.

5. The image forming apparatus according to claim 4, wherein the foil transfer unit further comprises a support member supporting the first reel and the second reel and movable with respect to the housing between a remote position away from the housing and a closed position close to the housing, the first reel and the second reel being exchangeable with a new first reel and a new second reel by movement of the support member to the remote position.

6. The image forming apparatus according to claim 5, wherein the support member is pivotally movable between the remote position and the closed position.

7. The image forming apparatus according to claim 1, further comprising:

a re-conveying passage branched from the second passage and joined to the first passage without passing through the foil transfer portion so as to guide the sheet fed out of the toner image forming portion toward the toner image forming portion, the re-conveying passage being connected to the outlet passage so that the outlet passage guides the sheet fed out of the foil transfer portion to the re-conveying passage; and an additional passage branched from the re-conveying passage and joined to the inlet passage so that the inlet passage guides the sheet conveyed through the additional passage to the foil transfer portion, the switch member including:

a discharge roller located at the second passage and switchable between a first rotating state in which the discharge roller rotates in a first direction to guide the sheet conveyed through the second passage to the discharge tray and a second rotating state in which the discharge roller rotates in a second direction opposite to the first direction to guide the sheet conveyed through the second passage into the re-conveying passage; and an additional switch member located at a position where the additional passage is branched from the re-conveying passage and switchable between a first guiding position to guide the sheet passing through the re-conveying passage to the additional passage and a second guiding position to guide the sheet passing through the re-conveying passage toward the first passage.

8. The image forming apparatus according to claim 7, wherein the inlet passage includes a first portion configured to guide the sheet at a position above the foil transfer portion, and a second portion configured to guide the sheet downward from the first portion toward the foil transfer portion, wherein the re-conveying passage includes:

a first re-conveying passage configured to guide the sheet to a position below the toner image forming portion, and a second re-conveying passage configured to guide the sheet guided by the first re-conveying passage to the first passage, the second re-conveying passage being positioned below the toner image forming portion, wherein the foil transfer portion is positioned above the second re-conveying passage and configured to convey the sheet vertically downward, and wherein the outlet passage is joined to the second re-conveying passage.

9. The image forming apparatus according to claim 1, wherein the second passage is connected to the inlet passage so that the sheet conveyed through the second passage is capable of being moved into the inlet passage, the second passage being also connected to the outlet passage so that the sheet moved past the foil transfer portion is moved to the discharge tray, the switch member being located at a position where the second passage is connected to the inlet passage and switchable between a first guiding position to guide the sheet passing through the second passage toward the discharge tray and a second guiding position to guide the sheet passing through the second passage into the inlet passage.

* * * * *